US012626927B2

(12) United States Patent
Sasaki et al.

(10) Patent No.: US 12,626,927 B2
(45) Date of Patent: May 12, 2026

(54) POSITIVE ELECTRODE MATERIAL AND BATTERY

(71) Applicant: Panasonic Intellectual Property Management Co., Ltd., Osaka (JP)

(72) Inventors: Izuru Sasaki, Aichi (JP); Yoshiaki Tanaka, Kyoto (JP); Kazuya Hashimoto, Aichi (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 813 days.

(21) Appl. No.: 17/960,134

(22) Filed: Oct. 5, 2022

(65) Prior Publication Data

US 2023/0042911 A1     Feb. 9, 2023

Related U.S. Application Data

(63) Continuation of application No. PCT/JP2021/016248, filed on Apr. 22, 2021.

(30) Foreign Application Priority Data

Apr. 28, 2020    (JP) ................................. 2020-079586

(51) Int. Cl.
    *H01M 4/62*        (2006.01)
    *H01M 4/131*       (2010.01)
        (Continued)
(52) U.S. Cl.
    CPC ............. *H01M 4/62* (2013.01); *H01M 4/131* (2013.01); *H01M 4/505* (2013.01); *H01M 4/525* (2013.01);
        (Continued)

(58) Field of Classification Search
    CPC .. H01M 10/0562; H01M 4/505; H01M 4/525; H01M 4/131; H01M 2004/028;
        (Continued)

(56) References Cited

U.S. PATENT DOCUMENTS

| | | | | |
|---|---|---|---|---|
| 12,068,453 B2 * | 8/2024 | Tanaka | .............. | H01M 10/0562 |
| 12,080,846 B2 * | 9/2024 | Tanaka | .............. | H01M 10/0562 |

(Continued)

FOREIGN PATENT DOCUMENTS

| | | |
|---|---|---|
| WO | 2018/025582 | 2/2018 |
| WO | 2018/025795 A1 | 2/2018 |

(Continued)

OTHER PUBLICATIONS

International Search Report of PCT application No. PCT/JP2021/016248 dated Jun. 29, 2021.

(Continued)

*Primary Examiner* — Laura Weiner
(74) *Attorney, Agent, or Firm* — Rimon P.C.

(57)          ABSTRACT

A positive electrode material in one aspect of the present disclosure includes: a positive electrode active material; and a first solid electrolyte that covers the surface of the positive electrode active material. The first solid electrolyte contains Li, M1, O, and X1. M1 is at least one element selected from the group consisting of Nb and Ta. X1 is at least one element selected from the group consisting of Cl, Br, and I.

13 Claims, 3 Drawing Sheets

(51) Int. Cl.

| | |
|---|---|
| *H01M 4/505* | (2010.01) |
| *H01M 4/525* | (2010.01) |
| *H01M 10/0525* | (2010.01) |
| *H01M 10/0562* | (2010.01) |
| *H01M 4/02* | (2006.01) |

(52) U.S. Cl.
CPC ... *H01M 10/0525* (2013.01); *H01M 10/0562* (2013.01); *H01M 2004/028* (2013.01); *H01M 2300/0068* (2013.01); *H01M 2300/008* (2013.01)

(58) Field of Classification Search
CPC ... H01M 2300/008; H01M 2300/0068; H01M 4/62; H01M 10/0525
See application file for complete search history.

(56) References Cited

U.S. PATENT DOCUMENTS 12,266,759 B2 * 4/2025 Takeuchi ......... H01M 10/0562

| | | | |
|---|---|---|---|
| 2014/0193695 A1 * | 7/2014 | Hoshina | ........... H01M 10/0562 429/156 |
| 2019/0088995 A1 | 3/2019 | Asano et al. | |
| 2020/0328466 A1 | 10/2020 | Nishio et al. | |
| 2020/0350623 A1 | 11/2020 | Sasaki et al. | |

FOREIGN PATENT DOCUMENTS

| | | |
|---|---|---|
| WO | 2019/135336 A1 | 7/2019 |
| WO | 2019/146216 A1 | 8/2019 |

OTHER PUBLICATIONS

Masahiro Tatsumisago et al., "All-solid-state lithium secondary batteries using sulfide-based glass-ceramic electrolytes", Journal of Power Sources 159(2006), May 24, 2006, pp. 193-199.

The EPC Office Action dated Sep. 27, 2023 for the related European Patent Application No. 21797710.7.

English Translation of Chinese Search Report dated Jan. 2, 2025 for the related Chinese Patent Application No. 202180029741.0.

* cited by examiner

POSITIVE ELECTRODE MATERIAL AND BATTERY

BACKGROUND

1. Technical Field

The present disclosure relates to a positive electrode material and a battery.

2. Description of the Related Art

International Publication No. WO2018/025582 discloses a battery that uses a halide as a solid electrolyte. Journal of Power Sources 159 (2006), p 193-199 discloses a battery that uses a sulfide as a solid electrolyte.

SUMMARY

One non-limiting and exemplary embodiment provides a positive electrode material that can improve the charge/discharge efficiency of a battery.

In one general aspect, the techniques disclosed here feature a positive electrode material including: a positive electrode active material; and a first solid electrolyte that covers a surface of the positive electrode active material. The first solid electrolyte contains Li, M1, O, and X1. M1 is at least one element selected from the group consisting of Nb and Ta, and X1 is at least one element selected from the group consisting of Cl, Br, and I.

The present disclosure provides a positive electrode material that can improve the charge/discharge efficiency of a battery.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is a graph showing a Cole-Cole plot obtained by the measurement of the impedance of a second solid electrolyte in Example 1.

Figure 1:
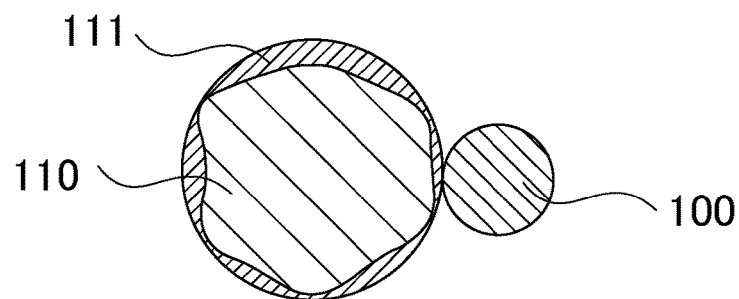
FIG. 1 is a cross-sectional view schematically illustrating the structure of a positive electrode material in embodiment 1.

DETAILED DESCRIPTIONS (Findings Underlying the Present Disclosure)

It is stated in International Publication No. WO2018/025582 that an all solid state secondary battery including a solid electrolyte composed of a halide containing Cl or Br can have good charge/discharge characteristics.

Meanwhile, the inventors have conducted extensive studies and found that the ionic conductivity of the solid electrolyte of a battery that is in contact with the positive electrode active material contributes to the charge/discharge efficiency of the battery and that better charge/discharge characteristics are obtained by bringing a solid electrolyte having higher ionic conductivity into contact with the positive electrode active material.

It is stated in Journal of Power Sources 159 (2006), p 193-199 that an all solid state secondary battery including a sulfide solid electrolyte can have good charge/discharge characteristics.

Meanwhile, the inventors have conducted extensive studies and found that, when the sulfide solid electrolyte is in contact with the positive electrode active material, the sulfide solid electrolyte undergoes oxidative decomposition during charging. The oxidative decomposition of the solid electrolyte causes a reduction in the charge/discharge efficiency of the battery. According to the results of the studies by the inventors, by bringing a solid electrolyte having oxidation stability into contact with the positive electrode active material, the oxidative decomposition of the sulfide solid electrolyte during charging can be prevented.

The inventors have thought that, by coating the surface of the positive electrode active material with a solid electrolyte having oxidation stability, the contact state between the positive electrode active material and the solid electrolyte can be achieved. Specifically, a solid electrolyte formed of a halide has higher oxidation stability than a sulfide solid electrolyte, and thus the oxidative decomposition of the sulfide solid electrolyte can be prevented.

According to the above findings, the inventors have arrived at the following positive electrode material of the present disclosure that can improve the charge/discharge efficiency of a battery.

Summary of Aspects of the Present Disclosure

A positive electrode material according to a first aspect of the present disclosure contains:

a positive electrode active material; and a first solid electrolyte that covers a surface of the positive electrode active material.

The first solid electrolyte contains Li, M1, O, and X1,

M1 is at least one element selected from the group consisting of Nb and Ta, and

X1 is at least one element selected from the group consisting of Cl, Br, and I.

In the positive electrode material in the first aspect, the surface of the positive electrode active material is covered with the first solid electrolyte. The first solid electrolyte may cover the entire surface of the positive electrode active material or may cover part of the surface of the positive electrode active material. Specifically, it is only necessary that the first solid electrolyte cover at least part of the surface of the positive electrode active material. The first solid electrolyte has high ionic conductivity and has high high-potential stability. Moreover, the first solid electrolyte has high oxidation resistance and is therefore resistant to oxidative decomposition when in contact with the positive electrode active material. As described above, in the positive electrode material in the first aspect, the positive electrode active material is in contact with the first solid electrolyte having high ionic conductivity and high oxidation resistance. Therefore, the positive electrode material in the first aspect can improve the charge/discharge efficiency of a battery.

According to a second aspect of the present disclosure, in the positive electrode material in, for example, the first aspect, X1 may include Cl.

The positive electrode material in the second aspect can further improve the charge/discharge efficiency of the battery.

According to a third aspect of the present disclosure, in the positive electrode material in, for example, the first or second aspect, M1 may include Ta.

The positive electrode material in the third aspect can further improve the charge/discharge efficiency of the battery.

According to a fourth aspect of the present disclosure, in the positive electrode material in, for example, any one of the first to third aspects, the molar ratio Li/M1 of Li to M1 may be equal to or more than 0.60 and may be equal to or less than 2.4, and the molar ratio O/X1 of O to X may be equal to or more than 0.16 and may be equal to or less than 0.35.

The positive electrode material in the fourth aspect can further improve the charge/discharge efficiency of the battery.

According to a fifth aspect of the present disclosure, in the positive electrode material in, for example, the fourth aspect, the molar ratio Li/M1 of Li to M1 may be equal to or more than 0.96 and may be equal to or less than 1.20.

The positive electrode material in the fifth aspect can further improve the charge/discharge efficiency of the battery.

According to a sixth aspect of the present disclosure, in the positive electrode material in, for example, any one of the first to fifth aspects, the positive electrode active material may contain Ni, Co, and Mn.

The positive electrode material in the sixth aspect can further improve the charge/discharge efficiency of the battery.

According to a seventh aspect of the present disclosure, the positive electrode material in, for example, any one of the first to sixth aspects may further contain a second solid electrolyte.

The positive electrode material in the seventh aspect can further improve the charge/discharge efficiency of the battery.

According to an eighth aspect of the present disclosure, in the positive electrode material in, for example, the seventh aspect, the second solid electrolyte may be represented by the following compositional formula (1):

$$Li_\alpha M2_\beta X2_\gamma, \hspace{2cm} \text{formula (1)}$$

wherein $\alpha$, $\beta$, and $\gamma$ are each independently a number larger than 0, wherein M2 is at least one element selected from the group consisting of metalloid elements and metallic elements other than Li, and wherein X2 is at least one element selected from the group consisting of F, Cl, Br, and I.

The positive electrode material in the eighth aspect can further improve the charge/discharge efficiency of the battery.

According to a ninth aspect of the present disclosure, in the positive electrode material in, for example, the eighth aspect, M2 may include yttrium (i.e., Y).

The positive electrode material in the ninth aspect can further improve the charge/discharge efficiency of the battery.

According to a tenth aspect of the present disclosure, in the positive electrode material in, for example, the eighth or ninth aspect, $\alpha$, $\beta$, and $\gamma$ in compositional formula (1) may satisfy $2.5 \leq \alpha \leq 3$, $1 \leq \beta \leq 1.1$, and $\gamma = 6$.

The positive electrode material in the tenth aspect can further improve the charge/discharge efficiency of the battery.

According to an eleventh aspect of the present disclosure, in the positive electrode material in, for example, any one of the eighth to tenth aspects, X2 may include at least one selected from the group consisting of Cl and Br.

The positive electrode material in the eleventh aspect can further improve the charge/discharge efficiency of the battery.

According to a twelfth aspect of the present disclosure, in the positive electrode material in, for example, the eleventh aspect, X2 may include Cl and Br.

The positive electrode material in the twelfth aspect can further improve the charge/discharge efficiency of the battery.

According to a thirteenth aspect of the present disclosure, in the positive electrode material in, for example, any one of the eighth to twelfth aspects, the second solid electrolyte may contain $Li_3YBr_2Cl_4$.

The positive electrode material in the thirteenth aspect can further improve the charge/discharge efficiency of the battery.

According to a fourteenth aspect of the present disclosure, in the positive electrode material in, for example, the seventh aspect, the second solid electrolyte may contain a sulfide solid electrolyte.

The positive electrode material in the fourteenth aspect can further improve the charge/discharge efficiency of the battery.

A battery in a fifteenth aspect of the present disclosure includes:

a positive electrode containing the positive electrode material in any one of the first to fourteenth aspects;

a negative electrode; and an electrolyte layer disposed between the positive electrode and the negative electrode.

The battery in the fifteenth aspect can have improved charge/discharge efficiency.

Embodiments of the present disclosure will be described with reference to the drawings.

Embodiment 1

A positive electrode material in embodiment 1 contains a positive electrode active material and a first solid electrolyte that covers the surface of the positive electrode active material. For example, the first solid electrolyte is located on the surface of the positive electrode active material to form a coating layer. The first solid electrolyte may cover the entire surface of the positive electrode active material or may cover part of the surface of the positive electrode active material.

The first solid electrolyte contains Li, M1, O, and X1. M1 is at least one element selected from the group consisting of Nb and Ta. X1 is at least one element selected from the group consisting of Cl, Br, and I.

In the positive electrode material in embodiment 1, the surface of the positive electrode active material is covered with the first solid electrolyte. The first solid electrolyte has high ionic conductivity and has high high-potential stability. Moreover, since the first solid electrolyte has high oxidation resistance, it is resistant to oxidative decomposition even when in contact with the positive electrode active material. As described above, in the positive electrode material in embodiment 1, the positive electrode active material is in contact with the first solid electrolyte having high ionic conductivity and high oxidation stability. In this case, the positive electrode material in embodiment 1 can improve the charge/discharge efficiency of a battery. Moreover, with the positive electrode material in embodiment 1, an increase in the reaction overpotential of the battery can be prevented.

In the positive electrode material in embodiment 1, X1 contained in the first solid electrolyte may include Cl. Specifically, the first solid electrolyte may contain Cl. When Cl is contained, the first solid electrolyte can have higher ionic conductivity and higher oxidation stability. Therefore, the thus-composed positive electrode material can further improve the charge/discharge efficiency of the battery.

In the positive electrode material in embodiment 1, M1 contained in the first solid electrolyte may include Ta. Specifically, the first solid electrolyte may contain Ta. When Ta is contained, the first solid electrolyte can have higher ionic conductivity and higher oxidation stability. Therefore, the thus-composed positive electrode material can further improve the charge/discharge efficiency of the battery. The first solid electrolyte may not contain sulfur.

In the first solid electrolyte in the positive electrode material in embodiment 1, the molar ratio Li/M1 of Li to M1 may be equal to or more than 0.60 and may be equal to or less than 2.4, and the molar ratio O/X1 of O to X1 may be equal to or more than 0.16 and may be equal to or less than 0.35. The molar ratio of Li to M1 is computed using the formula: (the molar amount of Li)/(the total molar amount of Ta and Nb). The molar ratio of O to X1 is computed using the formula: (the molar amount of O)/(the total molar amount of Cl, Br, and I). When the molar ratio Li/M1 is equal to or more than 0.60 and is equal to or less than 2.4 and the molar ratio O/X1 is equal to or more than 0.16 and is equal to or less than 0.35, the first solid electrolyte can have higher ionic conductivity. Therefore, the thus-composed positive electrode material can further improve the charge/discharge efficiency of the battery.

In the first solid electrolyte in the positive electrode material in embodiment 1, the molar ratio Li/Mi of Li to M1 may be equal to or more than 0.96 and may be equal to or less than 1.20. When the molar ratio Li/M1 is equal to or more than 0.96 and is equal to or less than 1.20, the first solid electrolyte can have higher ionic conductivity. Therefore, the thus-composed positive electrode material can further improve the charge/discharge efficiency of the battery.

In the positive electrode material in embodiment 1, the positive electrode active material is, for example, a material having the property of occluding and releasing metal ions (e.g., lithium ions). Examples of the positive electrode active material include lithium-containing transition metal oxides, transition metal fluorides, polyanion materials, fluorinated polyanion materials, transition metal sulfides, transition metal oxysulfides, and transition metal oxynitrides. Examples of the lithium-containing transition metal oxides include Li(Ni, Co, Al)$O_2$, Li(Ni, Co, Mn)$O_2$, and LiCoO$_2$. When the positive electrode active material used is, for example, a lithium-containing transition metal oxide, the production cost of the positive electrode can be reduced, and the average discharge voltage can be increased.

In embodiment 1, the positive electrode active material may contain Ni, Co, and Mn. For example, in embodiment 1, the positive electrode active material may be lithium nickel-cobalt-manganese oxide. For example, the positive electrode active material may be Li(Ni, Co, Mn)$O_2$.

With the above structure, the energy density and charge/discharge efficiency of the battery can be further improved.

The positive electrode material in embodiment 1 may further contain a second solid electrolyte.

For example, the second solid electrolyte contains a material having high ionic conductivity. The second solid electrolyte used may be, for example, a halide solid electrolyte. For example, a compound represented by compositional formula (1) below may be used. In the following formula, α, β, and γ are each independently a number larger than 0.

$$Li_\alpha M2_\beta X2_\gamma \qquad \text{formula (1)}$$

M2 is at least one element selected from the group consisting of metalloid elements and metallic elements other than Li. The "metalloid elements" include B, Si, Ge, As, Sb, and Te. The "metallic elements" include all elements included in groups 1 to 12 in the periodic table other than hydrogen and all elements included in groups 13 to 16 other than B, Si, Ge, As, Sb, Te, C, N, P, O, S, and Se. Specifically, M2 is selected from a group of elements each of which can serve as a cation when it forms, together with a halogen compound, an inorganic compound.

X2 is at least one element selected from the group consisting of F, Cl, Br, and I.

With the above structure, the ionic conductivity of the second solid electrolyte can be further improved. Therefore, the charge/discharge efficiency of the battery can be further improved.

In compositional formula (1), M2 may include yttrium (i.e., Y). Specifically, the second solid electrolyte may contain Y as a metallic element.

With the above structure, the ionic conductivity of the second solid electrolyte can be further improved. Therefore, the charge/discharge characteristics of the battery can be further improved.

The second solid electrolyte containing Y may be, for example, a compound represented by the compositional formula $Li_a Me_b Y_c X2_6$. Here, a+mb+3c=6 and c>0 are satisfied. Me is at least one selected from the group consisting of metalloid elements and metallic elements other than Li and Y. m is the valence of Me.

Me used may be at least one element selected from the group consisting of Mg, Ca, Sr, Ba, Zn, Sc, Al, Ga, Bi, Zr, Hf, Ti, Sn, Ta, and Nb.

With the above structure, the ionic conductivity of the second solid electrolyte can be further improved.

In compositional formula (1), $2.5 \leq \alpha \leq 3$, $1 \leq \beta \leq 1.1$ and $\gamma=6$ may be satisfied.

With the above structure, the ionic conductivity of the second solid electrolyte can be further improved. Therefore, the charge/discharge characteristics of the battery can be further improved.

In compositional formula (1), X2 may include at least one selected from the group consisting of Cl and Br. X2 may include both Cl and Br.

With the above structure, the ionic conductivity of the second solid electrolyte can be further improved. Therefore, the charge/discharge characteristics of the battery can be further improved.

The second solid electrolyte may be a material represented by the following compositional formula (B1):

$$Li_{6-3d} Y_d X2_6. \qquad \text{formula (B1)}$$

In compositional formula (B1), X2 is at least one element selected from the group consisting of F, Cl, Br, and I. In compositional formula (B1), 0<d<2 is satisfied.

With the above structure, the ionic conductivity of the second solid electrolyte can be further improved. Therefore, the charge/discharge efficiency of the battery can be further improved.

The second solid electrolyte may be a material represented by the following compositional formula (B2):

$$Li_3YX2_6. \qquad \text{formula (B2)}$$

In compositional formula (B2), X2 is at least one element selected from the group consisting of F, Cl, Br, and I.

With the above structure, the ionic conductivity of the second solid electrolyte can be further improved. Therefore, the charge/discharge efficiency of the battery can be further improved.

The second solid electrolyte may be a material represented by the following compositional formula (B3):

$$Li_{3-3\delta+a}Y_{1+\delta-a}Me_aCl_{6-x-y}Br_xI_y. \qquad \text{formula (B3)}$$

In compositional formula (B3), Me is one or two or more elements selected from the group consisting of Mg, Ca, Sr, Ba, and Zn.

In compositional formula (B3), $-1<\delta<2$, $0<a<3$, $0<(3-3\delta+a)$, $0<(1+\delta-a)$, $0\leq x<6$, $0<y\leq6$, and $(x+y)<6$ are satisfied.

With the above structure, the ionic conductivity of the second solid electrolyte can be further improved. Therefore, the charge/discharge efficiency of the battery can be further improved.

The second solid electrolyte may be a material represented by the following compositional formula (B4):

$$Li_{3-3\delta}Y_{1+\delta-a}Me_aCl_{6-x-y}Br_xI_y. \qquad \text{formula (B4)}$$

In compositional formula (B4), Me is one or two or more elements selected from the group consisting of Al, Sc, Ga, and Bi.

In compositional formula (B4), $-1<\delta<1$, $0<a<2$, $0<(1+\delta-a)$, $0\leq x<6$, $0<y\leq6$, and $(x+y)<6$ are satisfied.

With the above structure, the ionic conductivity of the second solid electrolyte can be further improved. Therefore, the charge/discharge efficiency of the battery can be further improved.

The second solid electrolyte may be a material represented by the following compositional formula (B5):

$$Li_{3-3\delta-a}Y_{1+\delta-a}Me_aCl_{6-x-y}Br_xI_y. \qquad \text{formula (B5)}$$

In compositional formula (B5), Me is one or two or more elements selected from the group consisting of Zr, Hf, and Ti.

In compositional formula (B5), $-1<\delta<1$, $0<a<1.5$, $0<(3-3\delta-a)$, $0<(1+\delta-a)$, $0\leq x<6$, $0<y\leq6$, and $(x+y)<6$ are satisfied.

With the above structure, the ionic conductivity of the second solid electrolyte can be further improved. Therefore, the charge/discharge efficiency of the battery can be further improved.

The second solid electrolyte may be a material represented by the following compositional formula (B6):

$$Li_{3-3\delta-2a}Y_{1+\delta-a}Me_aCl_{6-x-y}Br_xI_y. \qquad \text{formula (B6)}$$

In compositional formula (B6), Me is one or two or more elements selected from the group consisting of Ta and Nb.

In compositional formula (B6), $-1<\delta<1$, $0<a<1.2$, $0<(3-3\delta-2a)$, $0<(1+\delta-a)$, $0\leq x<6$, $0<y\leq6$, and $(x+y)<6$ are satisfied.

With the above structure, the ionic conductivity of the second solid electrolyte can be further improved. Therefore, the charge/discharge efficiency of the battery can be further improved.

The second solid electrolyte used may be, for example, $Li_3YX_6$, $Li_2MgX_4$, $Li_2FeX_4$, $Li(Al, Ga, In)X_4$, or $Li_3(Al, Ga, In)X_6$. Here, X may be at least one element selected from the group consisting of Cl and Br. The second solid electrolyte may contain, for example, $Li_3YBr_2Cl_4$. The halide solid electrolyte used as the second solid electrolyte may contain an oxygen atom serving as an anion other than the halogen atom(s). The second solid electrolyte may not contain sulfur.

The second solid electrolyte used may be, for example, a sulfide solid electrolyte. Examples of the sulfide solid electrolyte that can be used include $Li_2S—P_2S_5$, $Li_2S—SiS_2$, $Li_2S—B_2S_3$, $Li_2S—GeS_2$, $Li_{3.25}Ge_{0.25}P_{0.75}S_4$, and $Li_{10}GeP_2S_{12}$. LiX, $Li_2O$, $MO_q$, $LipMO_q$ etc.

may be added to these sulfide solid electrolytes. Here, X is one or two or more elements selected from the group consisting of F, Cl, Br, and I. M is one or two or more elements selected from the group consisting of P, Si, Ge, B, Al, Ga, In, Fe, and Zn. p and q are each independently a natural number.

In embodiment 1, the second solid electrolyte may be the sulfide solid electrolyte. For example, the sulfide solid electrolyte may contain lithium sulfide and phosphorus sulfide. For example, the sulfide solid electrolyte may be $Li_2S—P_2S_5$.

$Li_2S—P_2S_5$ has high ionic conductivity and is stable to oxidation and reduction. Therefore, the use of $Li_2S—P_2S_5$ can further improve the charge/discharge efficiency of the battery.

FIG. 1 is a cross-sectional view schematically showing the structure of the positive electrode material 1000 in embodiment 1. The positive electrode material 1000 in embodiment 1 includes a second solid electrolyte 100, a positive electrode active material 110, and a first solid electrolyte 111 that covers the surface of the positive electrode active material 110. For example, the first solid electrolyte 111 is located on the surface of the positive electrode active material 110 and thereby forms a coating layer. As shown in FIG. 1, the second solid electrolyte 100 and the positive electrode active material 110 may be each in the form of particles.

The thickness of the first solid electrolyte 111 may be equal to or larger than 1 nm and equal to or smaller than 500 nm.

When the thickness of the first solid electrolyte 111 is equal to or larger than 1 nm, the positive electrode active material 110 and the second solid electrolyte 100 are prevented from coming into to contact with each other, and a side reaction of the second solid electrolyte can be prevented. Therefore, the charge/discharge efficiency can be improved.

When the thickness of the first solid electrolyte 111 is equal to or smaller than 500 nm, the thickness of the first solid electrolyte 111 is not excessively large. In this case, the internal resistance of the battery can be reduced sufficiently. Therefore, the energy density of the battery can be increased.

The first solid electrolyte 111 may uniformly cover the entire surface of the positive electrode active material 110. In this case, the direct contact between the positive electrode active material 110 and the second solid electrolyte 100 is prevented, and the side reaction of the second solid electrolyte 100 can be prevented more reliably. Therefore, the charge/discharge characteristics of the battery can be further improved, and an increase in the reaction overpotential of the battery can be prevented.

Alternatively, the first solid electrolyte 111 may cover part of the surface of the positive electrode active material 110. In this case, a plurality of particles of the positive electrode active material 110 are in direct contact with each other through portions uncovered with the first solid electrolyte 111, so that the electron conductivity between the particles of the positive electrode active material 110 is improved. Therefore, the battery can operate at high power.

No particular limitation is imposed on the method for measuring the thickness of the first solid electrolyte 111. For example, the thickness can be determined by directly observing the thickness of the first solid electrolyte 111 using a transmission electron microscope etc. Alternatively, the thickness of the first solid electrolyte 111 can be determined from a change in the spectrum derived from the active material measured by XPS while removing the first solid electrolyte 111 by Ar sputtering.

No particular limitation is imposed on the shape of the second solid electrolyte 100 in embodiment 1. For example, the second solid electrolyte 100 may have a needle shape, a spherical shape, an elliptical shape, etc. For example, the second solid electrolyte 100 has a particle shape.

For example, when the second solid electrolyte 100 in embodiment 1 has a particle shape (e.g., a spherical shape), its median diameter may be equal to or smaller than 100 µm. When the median diameter is equal to or smaller than 100 µm, the positive electrode active material 110 and the second solid electrolyte 100 are well dispersed in the positive electrode material 1000, so that the charge/discharge characteristics are improved. In embodiment 1, the median diameter may be equal to or smaller than 10 µm.

In the thus-composed positive electrode material 1000, the positive electrode active material 110 and the second solid electrolyte 100 can form a good dispersed state.

In embodiment 1, the median diameter of the second solid electrolyte 100 may be smaller than the median diameter of the positive electrode active material 110.

With the above structure, the second solid electrolyte 100 and the positive electrode active material 110 can form a better dispersed state in the electrode.

The median diameter of the positive electrode active material 110 may be equal to or larger than 0.1 µm and may be equal to or smaller than 100 µm.

When the median diameter of the positive electrode active material 110 is equal to or larger than 0.1 µm, the positive electrode active material 110 and the second solid electrolyte 100 in the positive electrode material 1000 form a good dispersed state, so that the charge/discharge characteristics of the battery are improved. When the median diameter of the positive electrode active material 110 is equal to or smaller than 100 µm, lithium diffuses rapidly through the positive electrode active material 110, so that the high-power operation of the battery is further facilitated.

The median diameter of the positive electrode active material 110 may be larger than the median diameter of the second solid electrolyte 100. In this case, the positive electrode active material 110 and the second solid electrolyte 100 can form a good dispersed state.

The median diameter means a particle diameter at which a cumulative volume in a volume-based particle size distribution is equal to 50%. The volume-based particle size distribution is measured using, for example, a laser diffraction measurement apparatus or an image analyzer.

A Li—Nb—O compound such as $LiNbO_3$, a Li—B—O compound such as $LiBO_2$ or $Li_3BO_3$, a Li—Al—O compound such as $LiAlO_2$, a Li—Si—O compound such as $Li_4SiO_4$, a Li—Ti—O compound such as $Li_2SO_4$ or $Li_4Ti_5O_{12}$, a Li—Zr—O compound such as $Li_2ZrO_3$, a Li—Mo—O compound such as $Li_2MoO_3$, a Li—V—O compound such as $LiV_2O_5$, a Li—W—O such as $Li_2WO_4$, or a Li—P—O compound such as $Li_3PO_4$ may be further disposed on the surface of the positive electrode active material 110.

With the above structure, oxidation of the second solid electrolyte 100 in the positive electrode can be prevented.

In the positive electrode material 1000 in embodiment 1, the second solid electrolyte 100 and the first solid electrolyte 111 may be in contact with each other as shown in FIG. 1.

The positive electrode material 1000 in embodiment 1 may contain a plurality of particulate second solid electrolytes 100 and a plurality of particulate positive electrode active materials 110.

In the positive electrode material 1000 in embodiment 1, the content of the second solid electrolyte 100 and the content of the positive electrode active material 110 may be the same or different.

<Method for Producing First Solid Electrolyte and Second Solid Electrolyte>

The first solid electrolyte and the second solid electrolyte in embodiment 1 may be produced, for example, by the following method.

Raw material powders are prepared such that the mixing ratio of a target composition is obtained and mixed. Examples of the raw material powders include oxides, hydroxides, halides, and acid halides. For example, when $Li_3YCl_6$ is produced, LiCl and $YCl_3$ are prepared in a molar ratio of 3:1.

In this case, by selecting the types of raw material powders, "M1," "M2," "Me," "X1," and "X2" in the above compositional formulas can be determined. By adjusting the raw materials, the mixing ratio, and a synthesis process, the above values "β," "β," "γ," "d," "δ," "a," "x," and "y" can be controlled.

The raw material powders are well-mixed, then further mixed, pulverized, and reacted with each other using a mechanochemical milling method. Alternatively, the raw material powders are well-mixed and then sintered in a vacuum.

With the above method, the first solid electrolyte and the second solid electrolyte are obtained.

The structure of the crystal phase (i.e., the crystal structure) of each solid electrolyte can be determined by adjusting the method for reacting the raw material powders and the reaction conditions.

<Method for Producing Positive Electrode Active Material Coated with First Solid Electrolyte>

The positive electrode active material 110 coated with the first solid electrolyte 111 can be produced by the following method.

A powder of the positive electrode active material 110 and a powder of the first solid electrolyte 111 are mixed in an appropriate ratio to obtain a mixture. The mixture is subjected to milling treatment to impart mechanical energy to the mixture. A mixer such as a ball mill can be used for the milling treatment. To prevent oxidation of the materials, the milling treatment may be performed in a dry and inert atmosphere.

The positive electrode active material 110 coated with the first solid electrolyte 111 may be produced by a dry particle compositing method. The treatment in the dry particle compositing method includes imparting, to the positive electrode active material 110 and the first solid electrolyte 111, at least one type of mechanical energy selected from the group consisting of impact, compression, and shearing. The positive electrode active material 110 and the first solid electrolyte 111 are mixed in an appropriate ratio.

Embodiment 2

Embodiment 2 will next be described. A redundant description of the same parts as those in embodiment 1 will be appropriately omitted.

Figure 2:
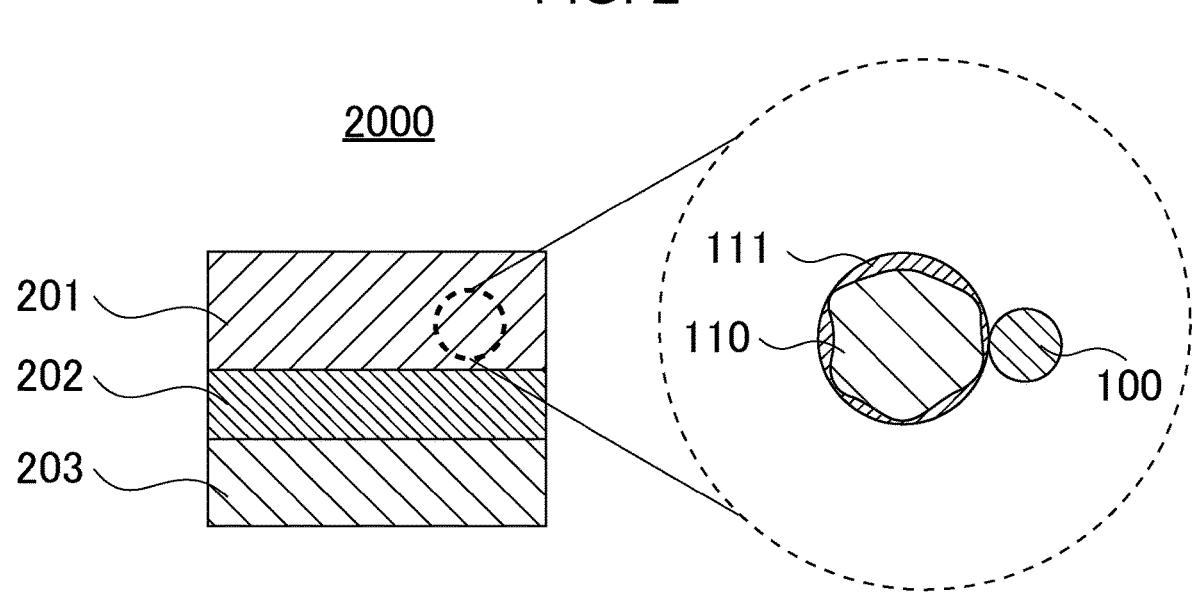
FIG. 2 is a cross-sectional view schematically illustrating the structure of a battery in embodiment 2.

FIG. 2 is a cross-sectional view schematically showing the structure of a battery 2000 in embodiment 2.

The battery 2000 in embodiment 2 includes a positive electrode 201, an electrolyte layer 202, and a negative electrode 203.

The positive electrode 201 contains the positive electrode material 1000 in embodiment 1.

The electrolyte layer 202 is disposed between the positive electrode 201 and the negative electrode 203.

With the above structure, the charge/discharge efficiency of the battery 2000 can be improved.

As for the volume ratio "v1:100-v1" of the positive electrode active material 110 to the second solid electrolyte 100 contained in the positive electrode 201, $30 \leq v1 \leq 95$ may be satisfied. Here, v1 is the volume ratio of the positive electrode active material 110 when the total volume of the positive electrode active material 110 and the second solid electrolyte 100 contained in the positive electrode 201 is set to 100. When $30 \leq v1$ is satisfied, the battery 2000 can easily have sufficient energy density. When $v1 \leq 95$ is satisfied, the high-power operation of the battery 2000 is further facilitated.

The thickness of the positive electrode 201 may be equal to or larger than 10 μm and may be equal to or smaller than 500 μm. When the thickness of the positive electrode 201 is equal to or larger than 10 μm, the battery 2000 can easily have sufficient energy density. When the thickness of the positive electrode 201 is equal to or smaller than 500 μm, the high-power operation of the battery 2000 is further facilitated.

The electrolyte layer 202 is disposed between the positive electrode 201 and the negative electrode 203.

The electrolyte layer 202 is a layer containing an electrolyte material. The electrolyte material is, for example, a solid electrolyte (i.e., a third solid electrolyte). Specifically, the electrolyte layer 202 may be a solid electrolyte layer.

A halide solid electrolyte having the same composition as that of the first solid electrolyte and/or the second solid electrolyte described above in embodiment 1 may be used as the third solid electrolyte contained in the electrolyte layer 202. Specifically, the electrolyte layer 202 may contain a halide solid electrolyte having the same composition as that of the first solid electrolyte and/or the second solid electrolyte described above in embodiment 1.

With the above structure, the charge/discharge efficiency of the battery 2000 can be further improved.

The third solid electrolyte contained in the electrolyte layer 202 may be a halide solid electrolyte having a composition different from that of the first solid electrolyte and the second solid electrolyte described above in embodiment 1. Specifically, the electrolyte layer 202 may contain a halide solid electrolyte having a composition different from that of the first solid electrolyte and the second solid electrolyte described above in embodiment 1.

With the above structure, the output density and charge/discharge efficiency of the battery 2000 can be further improved.

The halide solid electrolyte contained in the electrolyte layer 202 may contain Y as a metallic element.

With the above structure, the output density and charge/discharge efficiency of the battery 2000 can be improved.

A sulfide solid electrolyte may be used as the third solid electrolyte contained in the electrolyte layer 202. Specifically, the electrolyte layer 202 may contain a sulfide solid electrolyte.

With the above structure, since the sulfide solid electrolyte contained has good reduction stability, a low-potential negative electrode material such as graphite or metallic lithium can be used, so that the energy density of the battery 2000 can be increased.

$Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, $Li_{10}GeP_2S_{12}$, etc. may be used as the sulfide solid electrolyte used as the third solid electrolyte. LiX, $Li_2O$, $MO_q$, $Li_pMO_q$, etc. may be added to these sulfide solid electrolytes. Here, X is one or two or more elements selected from the group consisting of F, Cl, Br, and I. M is one or two or more elements selected from the group consisting of P, Si, Ge, B, Al, Ga, In, Fe, and Zn. p and q are each independently a natural number.

The sulfide solid electrolyte used as the third solid electrolyte may be a sulfide solid electrolyte having the same composition as that of the second solid electrolyte described above in embodiment 1. Specifically, the electrolyte layer 202 may contain a sulfide solid electrolyte having the same composition as that of the second solid electrolyte described above in embodiment 1.

With the above structure, since the sulfide solid electrolyte contained has good reduction stability, a low-potential negative electrode material such as graphite or metallic lithium can be used, so that the energy density of the battery can be improved. With the structure in which the electrolyte layer 202 contains the same sulfide solid electrolyte as that in the second solid electrolyte in embodiment 1, the charge/discharge characteristics of the battery can be improved.

An oxide solid electrolyte, a polymer solid electrolyte, or a complex hydride solid electrolyte may be used as the third solid electrolyte contained in the electrolyte layer 202.

Examples of the oxide solid electrolyte that can be used include: NASICON solid electrolytes typified by $LiTi_2(PO_4)_3$ and element-substituted products thereof; (LaLi)$TiO_3$-based perovskite solid electrolytes; LISICON solid electrolytes typified by $Li_{14}ZnGe_4O_{16}$, $Li_4SiO_4$, and $LiGeO_4$ and element-substituted products thereof; garnet solid electrolytes typified by $Li_7La_3Zr_2O_{12}$ and element-substituted products thereof; $Li_3N$ and H-substituted products thereof; $Li_3PO_4$ and N-substituted products thereof; glass containing, as a base material, a Li—B—O compound such as $LiBO_2$ or $Li_3BO_3$ with $Li_2SO_4$, $Li_2CO_3$, etc. added thereto; and glass ceramics.

The polymer solid electrolyte used may be, for example, a compound prepared using a polymer compound and a lithium salt. The polymer compound may have an ethylene oxide structure. When the polymer compound has the ethylene oxide structure, a large amount of the lithium salt can be contained, so that the ionic conductivity can be further improved. The lithium salt used may be $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, or $LiC(SO_2CF_3)_3$. The lithium salt used may be one lithium salt selected from these lithium salts. Alternatively, the lithium salt used may be a mixture of two or more lithium salts selected from these lithium salts.

The complex hydride solid electrolyte used may be, for example, $LiBH_4$—LiI or $LiBH_4$—$P_2S_5$.

The electrolyte layer 202 may contain the third solid electrolyte as a main component. Specifically, the electrolyte layer 202 may contain the third solid electrolyte, for example, in an amount equal to or more than 50% by mass with respect to the total mass of the electrolyte layer 202.

With the above structure, the charge/discharge characteristics of the battery 2000 can be further improved.

The electrolyte layer 202 may contain the third solid electrolyte, for example, in an amount equal to or more than 70% by mass with respect to the total mass of the electrolyte layer 202.

With the above structure, the charge/discharge characteristics of the battery 2000 can be further improved.

The electrolyte layer 202 containing the third solid electrolyte as a main component may further contain inevitable impurities or starting materials used to synthesize the third solid electrolyte, byproducts thereof, and decomposition products thereof.

The electrolyte layer 202 may contain the third solid electrolyte in an amount of 100% by mass with respect to the total mass of the electrolyte layer 202 excluding impurities inevitably mixed.

With the above structure, the charge/discharge characteristics of the battery 2000 can be further improved.

As described above, the electrolyte layer 202 may be composed only of the third solid electrolyte.

The electrolyte layer 202 may contain two or more of the materials exemplified as the third solid electrolyte. For example, the solid electrolyte layer may contain a halide solid electrolyte and a sulfide solid electrolyte.

The thickness of the electrolyte layer 202 may be equal to or larger than 1 μm and may be equal to or smaller than 300 μm. When the thickness of the electrolyte layer 202 is equal to or larger than 1 μm, the possibility of a short circuit between the positive electrode 201 and the negative electrode 203 is low. When the thickness of the electrolyte layer 202 is equal to or smaller than 300 μm, high-power operation is facilitated. Specifically, when the thickness of the electrolyte layer 202 is adjusted appropriately, the safety of the battery 2000 can be ensured sufficiently, and the battery 2000 can operate at high power.

The negative electrode 203 contains a material having the property of occluding and releasing metal ions (e.g., lithium ions). The negative electrode 203 contains, for example, a negative electrode active material.

The negative electrode active material used may be a metal material, a carbon material, an oxide, a nitride, a tin compound, a silicon compound, etc. The metal material may be a single metal. Alternatively, the metal material may be an alloy. Examples of the metal material include metallic lithium and lithium alloys. Examples of the carbon material include natural graphite, coke, partially graphitized carbon, carbon fibers, spherical carbon, artificial graphite, and amorphous carbon. From the viewpoint of capacity density, silicon (Si), tin (Sn), a silicon compound, or a tin compound may be used.

The negative electrode 203 may contain a fourth solid electrolyte. With this structure, lithium ion conductivity inside the negative electrode is increased, and high-power operation can be achieved. Any of the materials exemplified as the third solid electrolyte in the electrolyte layer 202 can be used as the fourth solid electrolyte contained in the negative electrode 203.

The median diameter of the particles of the negative electrode active material may be equal to or larger than 0.1 μm and may be equal to or smaller than 100 μm. When the median diameter of the negative electrode active material is equal to or larger than 0.1 μm, the particles of the negative electrode active material and the third solid electrolyte in the negative electrode 203 are in a well-dispersed state, so that the charge/discharge characteristics of the battery 2000 is improved. When the median diameter of the particles of the negative electrode active material is equal to or smaller than 100 μm, lithium diffuses rapidly through the particles of the negative electrode active material, so that the high-power operation of the battery is further facilitated.

The median diameter of the negative electrode active material particles may be larger than the median diameter of the fourth solid electrolyte. In this case, the negative electrode active material particles and the solid electrolyte can form a good dispersed state.

As for the volume ratio "v2:100-v2" of the negative electrode active material particles to the fourth solid electrolyte contained in the negative electrode 203, $30 \leq v2 \leq 95$ may be satisfied. When $30 \leq v2$ is satisfied, the battery 2000 can easily have sufficient energy density. When $v2 \leq 95$ is satisfied, the high-power operation of the battery 2000 is further facilitated.

The thickness of the negative electrode 203 may be equal to or larger than 10 μm and may be equal to or smaller than 500 μm. When the thickness of the negative electrode 203 is equal to or larger than 10 μm, the battery 2000 can easily have sufficient energy density. When the thickness of the negative electrode 203 is equal to or smaller than 500 μm, the high-power operation of the battery 2000 is further facilitated.

At least one selected from the group consisting of the positive electrode 201, the electrolyte layer 202, and the negative electrode 203 may contain a binder for the purpose of improving the adhesion between particles. The binder is used to improve the adhesion between the materials forming the electrodes and the electrolyte layer. Examples of the binder include polyvinylidene fluoride, polytetrafluoroethylene, polyethylene, polypropylene, aramid resins, polyamides, polyimides, polyamide-imides, polyacrylonitrile, polyacrylic acid, polymethyl acrylate, polyethyl acrylate, polyhexyl acrylate, polymethacrylic acid, polymethyl methacrylate, polyethyl methacrylate, polyhexyl methacrylate, polyvinyl acetate, polyvinylpyrrolidone, polyethers, polyethersulfone, hexafluoropolypropylene, styrene-butadiene rubber, and carboxymethyl cellulose. The binder used may be a copolymer of at least two materials selected from tetrafluoroethylene, hexafluoroethylene, hexafluoropropylene, perfluoroalkyl vinyl ethers, vinylidene fluoride, chlorotrifluoroethylene, ethylene, propylene, pentafluoropropylene, fluoromethyl vinyl ether, acrylic acid, and hexadiene. The binder used may be a mixture of at least two materials selected from the above-described materials.

At least one of the positive electrode 201 or the negative electrode 203 may contain a conductive assistant for the purpose of improving electron conductivity. Examples of the conductive assistant that can be used include: graphite such as natural graphite and artificial graphite; carbon blacks such as acetylene black and Ketjen black; conductive fibers such as carbon fibers and metal fibers; fluorinated carbon; metal powders such as aluminum powder; conductive whiskers such as zinc oxide and potassium titanate; conductive meal oxides such as titanium oxide; and conductive polymer compounds such as polyaniline, polypyrrole, and polythiophene. When a carbon conductive assistant is used, a reduction in cost can be achieved.

The battery 2000 in embodiment 2 may be formed as batteries with different shapes such as coin-shaped, cylindrical, square, sheet-shaped, button-shaped, flattened, and stacked batteries.

The battery 2000 in embodiment 2 may be produced, for example, by preparing the positive electrode material 1000 in embodiment 1, the material for forming the electrolyte layer, and the material for forming the negative electrode and producing a stack including the positive electrode, the electrolyte layer, and the negative electrode disposed in this order using a known method.

EXAMPLES

The present disclosure will next be described in more detail with reference to Examples and Comparative Examples.

Example 1

[Production of Second Solid Electrolyte]

Raw material powders of LiCl, LiBr, and $YCl_3$ were weighed in a molar ratio of $LiCl:LiBr:YCl_3=1:2:1$ in an argon glove box with a dew point equal to or lower than $-60°$ C. Then a planetary ball mill (type P-5 manufactured by Fritsch) was used to perform milling treatment at 600 rpm for 25 hours to thereby obtain a powder of second solid electrolyte $Li_3YBr_2Cl_4$.

(Evaluation of Ionic Conductivity)

Figure 3:
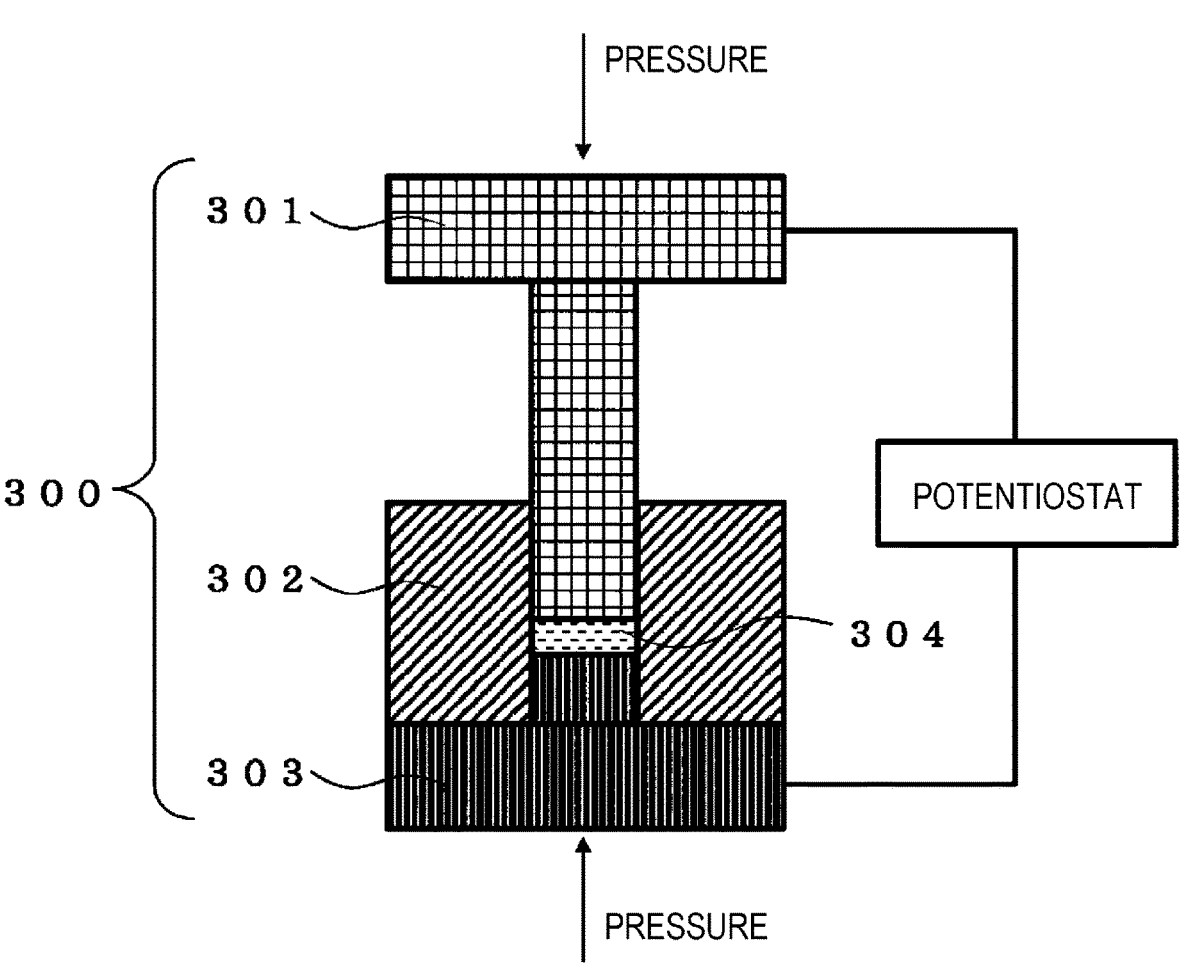
FIG. 3 is a schematic illustration of a press forming die used to evaluate the ionic conductivity of a solid electrolyte.

FIG. 3 is a schematic illustration showing a press forming die 300 used to evaluate the ionic conductivity of the solid electrolyte.

The press forming die 300 includes an upper punch 301, a frame die 302, and a lower punch 303. The frame die 302 is formed of insulating polycarbonate. The upper punch 301 and the lower punch 303 are formed of electron conductive stainless steel.

The press forming die 300 shown in FIG. 3 was used to measure the impedance of the second solid electrolyte in Example 1 using the following method.

The second solid electrolyte in Example 1 was filled into the press forming die 300 in a dry atmosphere with a dew point equal to or lower than $-30°$ C. The upper punch 301 and the lower punch 303 were used to apply a pressure of 300 MPa to the second solid electrolyte in Example 1 disposed inside the press forming die 300 (i.e., a solid electrolyte powder 304 in FIG. 3).

With the pressure applied, the upper punch 301 and the lower punch 303 were connected to a potentiostat (VersaS-TAT 4, Princeton Applied Research) equipped with a frequency response analyzer. The upper punch 301 was connected to a working electrode and a potential measurement terminal. The lower punch 303 was connected to a counter electrode. The impedance of the solid electrolyte was measured at room temperature using an electrochemical impedance measurement method.

Figure 4:
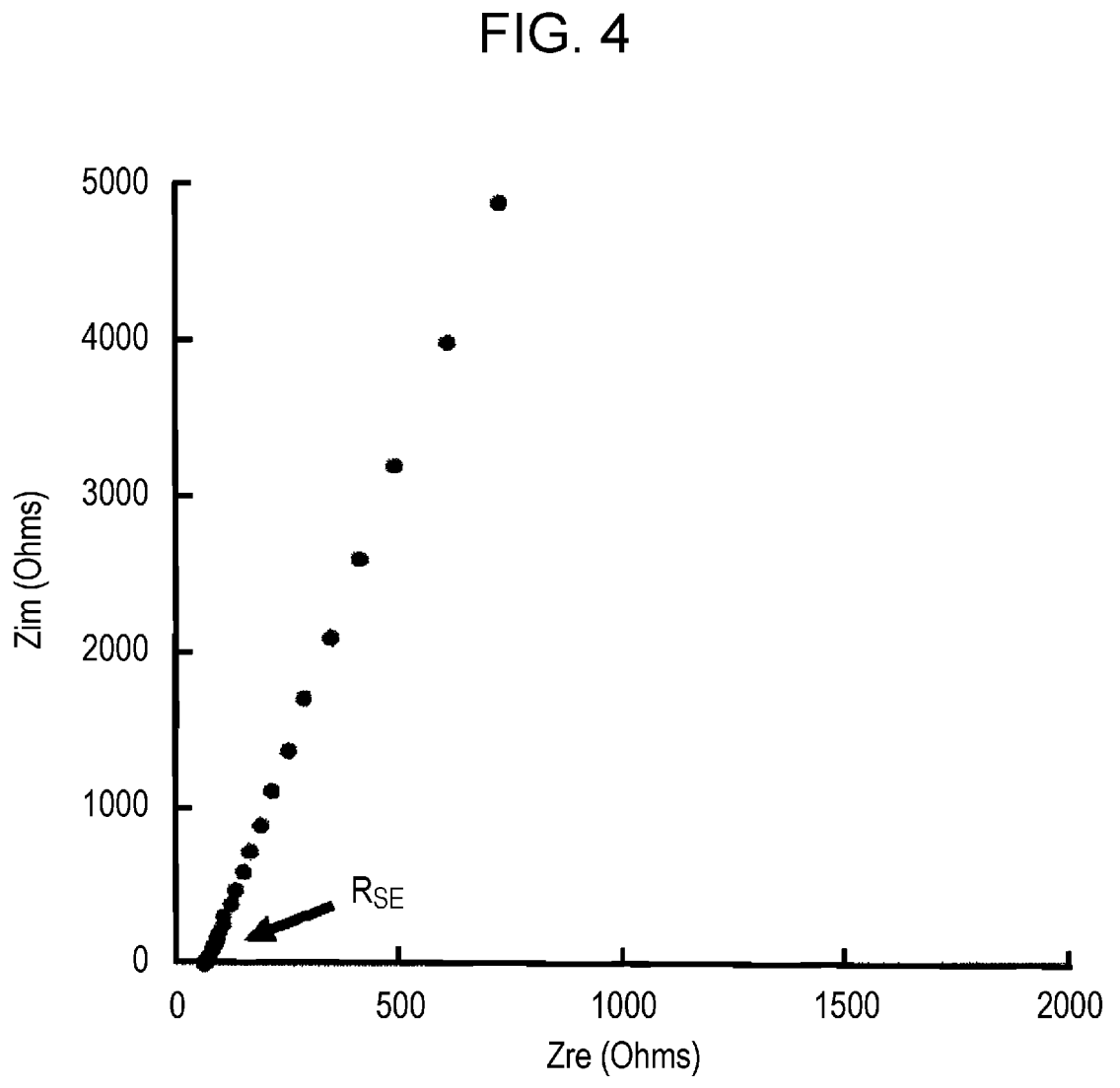

FIG. 4 is a graph showing a Cole-Cole plot obtained by the measurement of the impedance of the second solid electrolyte in Example 1.

In FIG. 4, the real value of the complex impedance at a measurement point at which the absolute value of the phase of the complex impedance was minimum was regarded as the ionic conduction resistance of the second solid electrolyte in Example 1. See an arrow $R_{SE}$ shown in FIG. 4 for this real value. This resistance value was used to compute the ionic conductivity from the following formula (1).

$$\sigma=(R_{SE}\times S/t)^{-1} \qquad (1)$$

Here, $\sigma$ represents the ionic conductivity. S represents the area of contact between the solid electrolyte and the upper punch 301 (that is equal to the area of a hollow portion of the frame die 302 in FIG. 3). $R_{SE}$ represents the resistance value of the solid electrolyte. t represents the thickness of the solid electrolyte (the thickness of a layer formed of the solid electrolyte powder 304 in FIG. 3).

The ionic conductivity of $Li_3YBr_2Cl_4$ used as the second solid electrolyte was $1.41\times10^{-3}$ S/cm as measured at $22°$ C.

[Production of Positive Electrode Active Material Coated with First Solid Electrolyte]

(Production of First Solid Electrolyte)

Raw material powders of $Li_2O_2$ and $NbCl_5$ were weighed in a molar ratio of $Li_2O_2:NbCl_5=1:2$ in a dry atmosphere with a dew point equal to or lower than $-30°$ C. (hereinafter referred to as a "dry atmosphere"). These raw material powders were pulverized and mixed in a mortar to obtain a powder mixture. The obtained powder mixture was subjected to milling treatment at 600 rpm for 24 hours using a planetary ball mill. Then the resulting powder mixture was heat-treated at $200°$ C. for 6 hours.

A first solid electrolyte powder in Example 1 composed of Li, Nb, O, and Cl was thereby obtained. The composition of the obtained first solid electrolyte in Example 1 was measured as follows. ICP emission spectrometry was used for Li and Nb. Ion chromatography was used for Cl, and an inert gas fusion-infrared absorption method was used for O. The devices used for the measurement of the composition were an ICP emission spectrometer ("iCAP 7400" (manufactured by Thermo Fisher Scientific)), an ion chromatography device ("ICS-2000" (manufactured by Dionex)), and an oxygen analyzer ("EMGA-930" (manufactured by HORIBA Ltd.)). In the first solid electrolyte in Example 1, the molar ratio Li/Nb was 1.20, and the molar ratio O/Cl was 0.35.

(Evaluation of Ionic Conductivity)

The ionic conductivity of the first solid electrolyte was measured using the same method as that for measuring the ionic conductivity of the second solid electrolyte. The ionic conductivity of the first solid electrolyte in Example 1 that was measured at $22°$ C. was $9.2\times10^{-3}$ S/cm.

(Production of Positive Electrode Active Material Coated with First Solid Electrolyte)

$Li(Ni, Co, Mn)O_2$ (hereinafter denoted as NCM) was used as the positive electrode active material. To form a coating layer composed of the first solid electrolyte LiNbOCl on the NCM, a particle complexing device (NOB-MINI manufactured by Hosokawa Micron Group) was used to perform compression shearing treatment. Specifically, the positive electrode active material and the first solid electrolyte were weighed in a mass ratio of 93.72:6.28, and a coating layer composed of the first solid electrolyte was formed on the surface of the NCM particles using a blade clearance of 2 mm and a treatment time of 45 min. In this manner, the coated positive electrode active material in Example 1 was produced.

[Production of Positive Electrode Material]

The coated positive electrode active material in Example 1 and the second solid electrolyte in Example 1 were weighed in an argon glove box such that the volume ratio of the positive electrode active material in the coated positive electrode active material to the sum of the first solid electrolyte in Example 1 and the second solid electrolyte in Example 1, i.e., the positive electrode active material:(the first solid electrolyte+the second solid electrolyte), was 73:27. These were mixed in an agate mortar to produce a positive electrode material in Example 1.

Example 2

$Li_2O_2$, $TaCl_5$, and $NbCl_5$ used as raw material powders of the first solid electrolyte were weighed in a molar ratio of $Li_2O_2:TaCl_5:NbCl_5=1:1.8:0.2$, and the first solid electrolyte was produced and used for a coating layer for the positive electrode active material. A positive electrode material in Example 2 was obtained using the same method as in Example 1 above except for the above change. The ionic conductivity of the first solid electrolyte was $9.9 \times 10^{-3}$ S/cm.

Example 3

$Li_2O_2$ and $TaCl_5$ used as raw material powders of the first solid electrolyte were weighed in a molar ratio of $Li_2O_2$:$TaCl_5$=1:2, and the first solid electrolyte was produced and used for a coating layer for the positive electrode active material. A positive electrode material in Example 3 was obtained using the same method as in Example 1 above except for the above change. The ionic conductivity of the first solid electrolyte was $8.2 \times 10^{-3}$ S/cm.

Example 4

[Production of Second Solid Electrolyte]

$Li_2S$ and $P_2S_5$ were weighed in a molar ratio of $Li_2S$:$P_2S_5$=75:25 in an argon glove box with a dew point equal to or lower than $-60°$ C. These were pulverized and mixed in a mortar. Then a planetary ball mill (Type P-7 manufactured by Fritsch) was used to perform milling treatment at 510 rpm for 10 hours to thereby obtain a glass-like solid electrolyte. The glass-like solid electrolyte was subjected to heat treatment in an inert atmosphere at $270°$ C. for 2 hours. $Li_2S$—$P_2S_5$ in the form of a glass ceramic-like solid electrolyte was thereby obtained.

(Evaluation of Ionic Conductivity)

The ionic conductivity of the second solid electrolyte in Example 4 was measured using the same method as that for the measurement of the ionic conductivity of the second solid electrolyte in Example 1. The ionic conductivity of the second solid electrolyte in Example 4 that was measured at $22°$ C. was $0.60 \times 10^{-3}$ S/cm.

[Production of Positive Electrode Material]

The coated positive electrode active material in Example 2 and the second solid electrolyte in Example 4 were weighed in an argon glove box such that the volume ratio of the positive electrode active material in the coated positive electrode active material in Example 2 to the sum of the first solid electrolyte in the coated positive electrode active material in Example 2 and the second solid electrolyte in Example 4, i.e., the positive electrode active material:(the first solid electrolyte+the second solid electrolyte), was 50:50. These were mixed in an agate mortar to produce a positive electrode material in Example 4.

Comparative Example 1

A positive electrode material in Comparative Example 1 was obtained using the same method as in Example 1 above except that the positive electrode active material coating layer was not produced and that the NCM with no coating layer formed thereon was used.

Comparative Example 2

A positive electrode material in Comparative Example 2 was obtained using the same method as in Example 4 above except that the positive electrode active material coating layer was not produced and that the NCM with no coating layer formed thereon was used.

[Production of Batteries]

The positive electrode materials in Examples 1 to 4 and Comparative Examples 1 and 2, $Li_3YBr_2Cl_4$, and glass ceramic-like $Li_2S$—$P_2S_5$ were used to perform the following process.

First, 60 mg of $Li_2S$—$P_2S_5$, 20 mg of $Li_3YBr_2Cl_4$, and the positive electrode material were stacked in this order in an insulating outer cylinder. In this case, the mass of the positive electrode material was weighed such that the mass of the positive electrode active material was 14 mg. These materials were subjected to press forming at a pressure of 720 MPa to thereby obtain a positive electrode and a solid electrolyte layer.

Next, metallic Li (thickness: 200 µm) was stacked on the surface of the solid electrolyte layer that was opposite to the side in contact with the positive electrode. The stack was subjected to press forming at a pressure of 80 MPa to thereby obtained a layered body including the positive electrode, the solid electrolyte layer, and the negative electrode.

Next, stainless steel current collectors were disposed on the upper and lower sides of the layered body, and current collector leads were attached to the current collectors.

Finally, an insulating ferrule was used to isolate and seal the inside of the insulating outer cylinder from the outside to thereby produce a battery.

Batteries in Examples 1 to 4 and Comparative Examples 1 and 2 were thereby produced.

[Charging Test]

Each of the batteries in Examples 1 to 4 and Comparative Examples 1 and 2 above was used to perform a charging test under the following conditions.

The battery was disposed in a thermostat oven at $25°$ C.

The battery was subjected to constant-current charging to a voltage of 4.3 V using a current value of 140 µA corresponding to a 0.05 C rate (20-hour rate) with respect to the theoretical capacity of the battery and then rested for 20 min. Then the battery was subjected to constant current-discharging to a voltage of 2.5 V using a current value of 140 µA corresponding to a 0.05 C rate (20-hour rate) and then rested for 20 min.

The ratio of the obtained discharge capacity to the obtained charge capacity was used as the charge/discharge efficiency. The results are shown in Table 1 below. In Table 1, "LYBC" stands for $Li_3YBr_2Cl_4$, and "LPS" stands for $Li_2S$—$P_2S_5$.

TABLE 1

| | First solid electrolyte | Molar ratio Li/(Ta + Nb) | Molar ratio Ta/(Ta + Nb) | Molar ratio O/Cl | Second solid electrolyte | Charge/discharge efficiency |
|---|---|---|---|---|---|---|
| Example 1 | Li, Nb, O, Cl | 1.2 | 0 | 0.35 | LYBC | 91% |
| Example 2 | Li, Ta, Nb, O, Cl | 1.2 | 0.9 | 0.35 | LYBC | 90% |
| Example 3 | Li, Ta, O, Cl | 1.2 | 1.0 | 0.35 | LYBC | 91% |

TABLE 1-continued

| | First solid electrolyte | Molar ratio Li/(Ta + Nb) | Molar ratio Ta/(Ta + Nb) | Molar ratio O/Cl | Second solid electrolyte | Charge/discharge efficiency |
|---|---|---|---|---|---|---|
| Example 4 | Li, Ta, Nb, O, Cl | 1.2 | 0.9 | 0.35 | LPS | 72% |
| Comparative Example 1 | — | — | — | — | LYBC | 87% |
| Comparative Example 2 | — | — | — | — | LPS | 67% |

<<Discussion>>

As can be seen from the results in Examples 1 to 3 and Comparative Example 1 shown in Table 1, when the halide solid electrolyte is used as the second solid electrolyte, the first solid electrolyte disposed on the surface of the positive electrode active material improves the charge/discharge efficiency of the battery. Similarly, as can be seen from the results in Example 4 and Comparative Example 2 shown in Table 1, when the sulfide solid electrolyte is used as the second solid electrolyte, the use of the positive electrode material containing the positive electrode active material with its surface coated with the first solid electrolyte improves the charge/discharge efficiency of the battery. This may be because the surface of the positive electrode active material is covered with the first solid electrolyte having high ionic conductivity and high oxidation resistance. The rate of insertion/extraction of Li between the active material and the electrolyte is determined by the ionic conductivity of the electrolyte. In Examples 1 to 4, the conductivity of the electrolyte in contact with the active material is high, and this may be the reason for the reduction in the resistance to insertion/extraction of Li. Moreover, the first solid electrolyte having high oxidation resistance covers the surface of the positive electrode active material, and this may be the reason that the oxidation of the second solid electrolyte is suppressed. These may be the reasons for the improvement in the charge/discharge efficiency of the batteries in Examples 1 to 4.

The battery in the present disclosure can be used as an all solid state secondary battery etc.

What is claimed is:

1. A positive electrode material comprising:

a positive electrode active material; and a first solid electrolyte that covers a surface of the positive electrode active material, wherein the first solid electrolyte contains Li, M1, O, and X1, wherein M1 is at least one element selected from the group consisting of Nb and Ta, wherein X1 is at least one element selected from the group consisting of Cl, Br, and I, and wherein a molar ratio O/X1 of O to X1 in the first solid electrolyte is equal to or more than 0.16 and is equal to or less than 0.35.

2. The positive electrode material according to claim 1, wherein X1 includes Cl.

3. The positive electrode material according to claim 1, wherein M1 includes Ta.

4. The positive electrode material according to claim 1, wherein a molar ratio Li/M1 of Li to M1 in the first solid electrolyte is equal to or more than 0.60 and is equal to or less than 2.4.

5. The positive electrode material according to claim 4, wherein a molar ratio Li/M1 of Li to M1 in the first solid electrolyte is equal to or more than 0.96 and is equal to or less than 1.20.

6. The positive electrode material according to claim 1, wherein the positive electrode active material contains Li, Ni, Co, Mn, and O.

7. The positive electrode material according to claim 1, further comprising a second solid electrolyte, wherein the second solid electrolyte is represented by the following compositional formula:

$$Li_\alpha M2_\beta X2_\gamma,$$

wherein $\alpha$, $\beta$, and $\gamma$ are each independently a number larger than 0, wherein M2 is at least one element selected from the group consisting of metalloid elements and metallic elements other than Li, and wherein X2 is at least one element selected from the group consisting of F, Cl, Br, and I, wherein the positive electrode active material and the second solid electrolyte are each in a form of particles, and wherein the second solid electrolyte particle is in contact with the first solid electrolyte covering the surface of the positive electrode active material particle.

8. The positive electrode material according to claim 7, wherein M2 includes yttrium.

9. The positive electrode material according to claim 7, wherein, in the compositional formula, $\alpha$, $\beta$, and $\gamma$ satisfy $2.5 \leq \alpha \leq 3$, $1 \leq \beta \leq 1.1$, and $\gamma = 6$.

10. The positive electrode material according to claim 7, wherein X2 includes at least one selected from the group consisting of Cl and Br.

11. The positive electrode material according to claim 10, wherein X2 includes Cl and Br.

12. The positive electrode material according to claim 7, wherein the second solid electrolyte contains $Li_3YBr_2Cl_4$.

13. A battery comprising:

a positive electrode containing the positive electrode material according to claim 1;

a negative electrode; and an electrolyte layer disposed between the positive electrode and the negative electrode, wherein the electrolyte layer is a solid electrolyte layer containing a third solid electrolyte, and the third solid electrolyte meets one of the following requirements:

(i) a halide solid electrolyte having the same composition as the first solid electrolyte, (ii) a halide solid electrolyte having a composition different from the first solid electrolyte, (iii) a sulfide solid electrolyte, (iv) an oxide solid electrolyte, (v) a polymer solid electrolyte, or (vi) a complex hydride solid electrolyte.

* * * * *